Nov. 23, 1937.   W. JONES   2,099,893
MACHINE FOR GRADING OR SORTING BY WEIGHT
Filed May 15, 1935   3 Sheets-Sheet 1
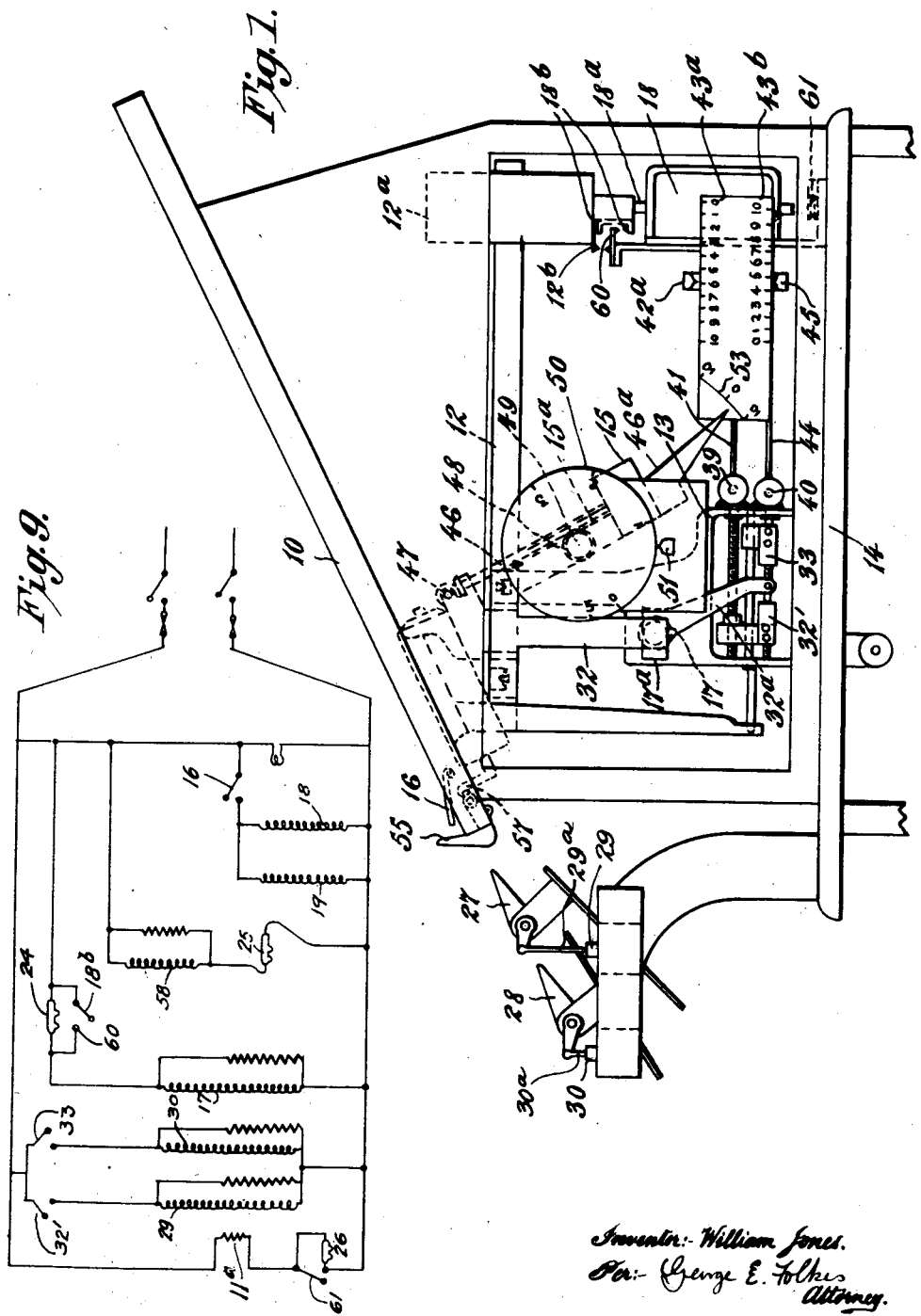

Nov. 23, 1937.  W. JONES  2,099,893
MACHINE FOR GRADING OR SORTING BY WEIGHT
Filed May 15, 1935  3 Sheets-Sheet 2
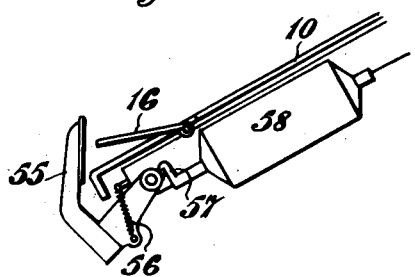
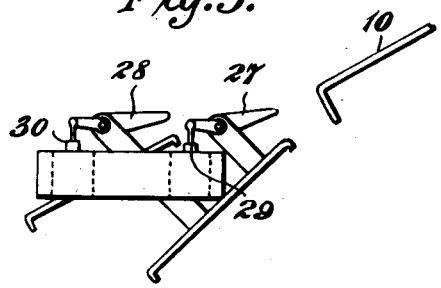
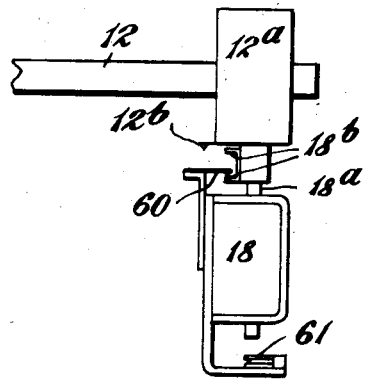
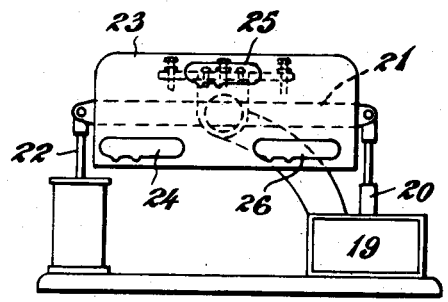
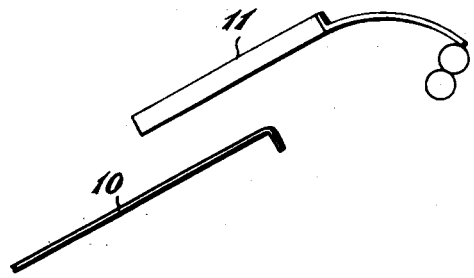
Inventor:- William Jones.
For:- George E Folkes
Attorney.

Nov. 23, 1937.   W. JONES   2,099,893
MACHINE FOR GRADING OR SORTING BY WEIGHT
Filed May 15, 1935   3 Sheets-Sheet 3

Inventor: William Jones.
Per: George E. Folkes,
Attorney.

Patented Nov. 23, 1937

2,099,893

UNITED STATES PATENT OFFICE 2,099,893

MACHINE FOR GRADING OR SORTING BY WEIGHT

William Jones, Soho Foundry, Birmingham, England, assignor to John Oliver Powell, Gorseinon, near Swansea, Wales, England Application May 15, 1935, Serial No. 21,570
In Great Britain May 18, 1934

8 Claims. (Cl. 209—121)

This invention has reference to an improved machine for grading or sorting by weight, and has for its object the provision of an improved machine for this purpose which is electrically controlled and entirely automatic in operation.

The invention consists of an improved machine for grading or sorting by weight embodying a load receiving device, an automatic weighing mechanism associated with said device, an electric circuit control means which assumes a circuit completing condition when a load is applied to the receiving device, electrically controlled means for ensuring the maintenance of the load on the receiving device until a weighing operation has been performed, electrically operated deflector mechanism capable of being brought into operation subsequent to the completion of a weighing operation, and electrically influenced means for maintaining the deflector mechanism active (if in operation) for a period of time necessary to ensure the transfer of the load from the receiving device and the restoration of the mechanism to the initial position.

The invention also resides in the combination with the improved machine for grading or sorting by weight of means for automatically bringing the weighing mechanism to its normal unloaded equilibrium position after a grading or sorting operation has been effected.

The invention further resides in means for electrically maintaining the weighing mechanism in the weighing position during the period in which the load is being transferred from the receiving device to the selected path.

The invention still further resides in the details of construction of the improved grading or sorting machine to be described hereinafter.

The invention will now be described with particular reference to the accompanying sheets of drawings which illustrate the invention in its application to a machine for grading or sorting tinplates by weight into light, correct and heavy groups.

In the drawings:—

Figure 1 is a side elevation of sufficient of the improved grading or sorting machine as is necessary to an understanding of the invention.

Figure 2 is a fragmentary view of the means for maintaining the tinplates on the weighing platform during grading and of the switch controlled by the said tinplates when in position on the weighing platform.

Figure 3 is a fragmentary view of the deflector mechanism.

Figure 4 is a fragmentary view of the means for automatically bringing the weighing mechanism to its normal unloaded equilibrium position after a grading or sorting operation has been effected.

Figure 5 is a fragmentary view of the delay action switch mechanism.

Figure 6 is a fragmentary view of the means for feeding the tinplates to the weighing platform.

Figure 9 is a diagram of the electric circuit employed.

In the drawings like numerals of reference indicate similar parts of the several views.

Figure 7:
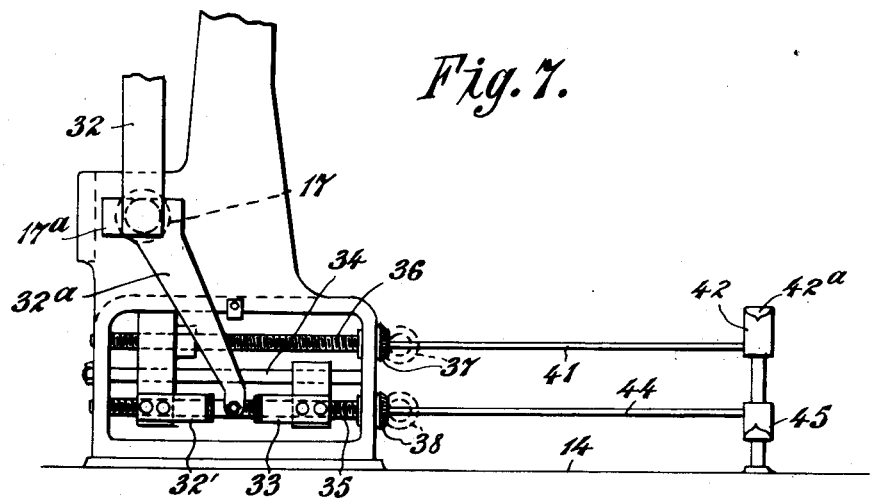
Figure 7 is a fragmentary view illustrating the means for locking the weighing mechanism in position after a weighing operation has been performed and for actuating the electrically operated deflector mechanism.
Figure 8:
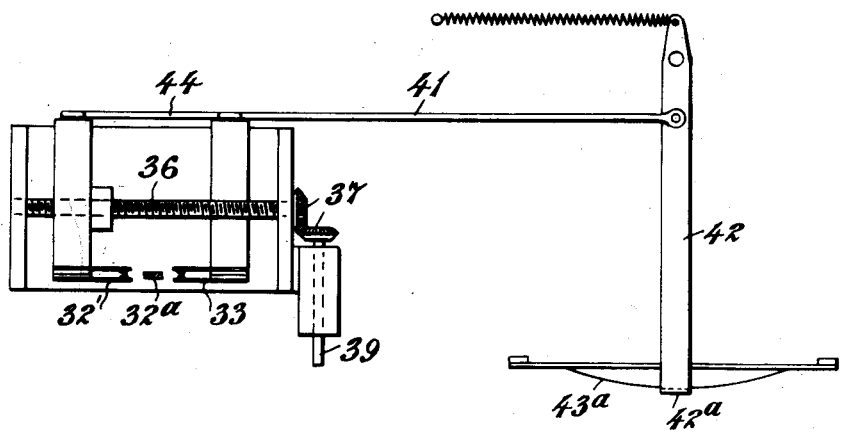
Figure 8 is a fragmentary view illustrating the means of adjusting the device for actuating the electrically operated deflector mechanism.

According to the embodiment of the invention illustrated in the drawings the improved machine comprises a weighing platform 10 arranged to incline downwardly from the receiving end towards the delivery end, said weighing platform 10 operating in conjunction with a magnetic feed platform 11 which is magnetized by electromagnets 11ª, the feed platform receiving the tinplates singly from a cleaning machine of known kind (Figs. 1 and 6). This weighing platform 10 is supported from one arm of a lever 12 which is fulcrumed in bearings carried by standards 13 supported from a frame 14 mounted on adjustable feet for facilitating leveling said lever 12 being referred to hereinafter as the weighing lever 12 and being normally maintained in a horizontal position and having a pendulous weight 15 adjustably supported therefrom. Pivotally mounted on the weighing platform 10 is a transversely disposed plate 16 which is normally projected away from the upper surface of the weighing platform 10 under the action of the springs. This plate 16 constitutes the contact making member of a switch hereinafter termed the platform switch which controls a circuit including a source of electric supply. The circuit controlled by the platform switch also incorporates a solenoid 17 hereinafter termed the locking solenoid 17, a solenoid 18 hereinafter termed the centralizing solenoid 18 and a solenoid 19 hereinafter termed the delay action solenoid 19. The armature 20 of the delay action solenoid 19 is suspended from one arm of an even-armed lever 21, henceforward to be referred to as the switch lever 21, which is fulcrumed in bearings carried by the frame 14. The other arm of this switch lever 21 has suspended therefrom the piston rod 22 of an air dashpot of known kind. Fixed to the switch lever 21 and symmetrical with the fulcrum thereof is a plate 23 carrying three mercury switch tubes 24, 25 and 26 of known construction.

Disposed in front of the delivery end of the weighing platform 10 and arranged one forward of the other is a pair of levers 27, 28, hereinafter termed deflectors, which are actuated by crank arms which in turn are actuated by the plungers 29a, 30a of a pair of electro-magnetic devices the solenoids 29, 30 whereof are called henceforth the deflector solenoids.

The deflector 27 nearest the delivery end of the weighing platform 10 is hereinafter termed the underweight deflector, the other deflector 28 being referred to as the overweight deflector. The underweight and overweight deflectors 27 and 28 are arranged so that the upper surfaces thereof are maintained normally in a plane slightly below the plane of the upper surface of the weighing platform 10.

In parallel with the deflector solenoids is the locking solenoid 17 the magnet pole 17a whereof co-operates with a flexible arm 32 secured to the weighing lever 12.

The circuit through the deflector solenoids 27, 28 is controlled by switches 32', 33 which co-operate with a contact closing member 32a which is connected to the flexible arm 32.

The switches 32', 33 are slidably mounted on a rod 34 and are adapted to be traversed on the said rod 34 by means of screws 35, 36 actuated by bevel gears 37, 38 which are rotated by means of shafts 39, 40 by keys (not shown). The switch 32', hereinafter termed the underweight switch, is connected with a rod 41 which has pivotal connection with a lever 42 carrying at its forward end an indicator 42a which co-operates with a graduated chart 43a. Similarly the switch 33, which is called hereinafter the overweight switch, through a rod 44 operates an indicator 45 which co-operates with a chart 43b the said indicators 42a and 45 being spring controlled.

The pendulous weight 15 is adjustable by means of a screw 46 actuated by a shaft 47 which is rotated by a key. This pendulous weight 15 has associated therewith a rack 15a which engages a pinion 48 mounted on a shaft 49 supported by brackets depending from the weighing lever 12 said shaft 49 carrying at its forward end a chart 50 which registers with a pointer 51 depending from the weighing lever 12. The screw 46 carrying the adjustable pendulous weight 15 is provided with a downward extension 46a which serves as a pointer and which co-operates with a graduated chart 53 which serves to enable the balance position of the machine to be checked in a manner that will be described hereinafter.

At its forward end the weighing platform co-operates with a flap 55 which is pivotally mounted relatively to the weighing platform and is normally maintained in an obstructing position at the lower edge of the weighing platform under the influence of a spring 56. The flap 55 co-operates with a latch 57 actuated by the armature of the solenoid 58, hereinafter termed the flap control solenoid 58.

The longer arm of the weighing lever 12 has mounted thereon a poiseweight 12a the underside of which co-acts with the armature 18a of the centralizing solenoid 18. This armature 18a carries at its upper end contacts 18b which co-operate with a fixed contact 60 and with a contact 12b carried by the poiseweight 12a. The lower end of the armature 18a co-operates with contacts 61 which in conjunction with the mercury switch tube 26 control electro-magnets 11a for magnetizing the feed platform 11.

The circuit diagram illustrated in Figure 9 discloses a suitable circuit utilizing direct current at a mains pressure of 210–240 volts.

In this diagram:—
The switch arm 16 corresponds to the plate 16.
The coil 17 corresponds to the locking solenoid 17.
The coil 18 corresponds to the centralizing solenoid 18.
The coil 19 corresponds to the delay action solenoid 19.
The switch 24 corresponds to the mercury switch tube 24.
The switch 25 corresponds to the mercury switch tube 25.
The switch 26 corresponds to the mercury switch tube 26.
The coil 29 corresponds to the deflector solenoid 29.
The coil 30 corresponds to the deflector solenoid 30.
The switch arm 32¹ corresponds to the underweight switch 32¹.
The switch arm 33 corresponds to the overweight switch 33.
The coil 58 corresponds to the solenoid 58 which controls the latch 57 for the flap 55.
The switch arm 61 corresponds to the contacts 61 which are closed by the lower end of the armature 18a.

The operation of the invention is as follows:—
The machine is balanced initially by placing on the empty weighing platform a known weight and the pendulous weight 15 adjusted on the screw 46 until the graduation on the chart 50 corresponding to this weight registers with the pointer 51 whereupon the pointer 46a will indicate the zero position on the chart 53. The weight is then removed leaving the machine correctly balanced for use.

The shafts 37 and 38 are then rotated by means of the keys to adjust the switches 32', 33 to afford the maximum percentage of under- or overweight which may be allowed the setting being assisted by the indicators 42a and 45 which register with the charts 43a, 43b and so give a visual indication of the tolerance limits of the under- and overweight percentage. This adjustment effects the setting of the switch contacts 32', 33 relatively to the contact closing member 32a depending from the resilient arm 32. The pendulous weight 15 is then adjusted by means of the shaft 47 until the pointer 51 on the weighing lever 12 registers with a graduation on the chart 50 denoting the weight of the grade of tinplate on which the machine is to work for any sequence. The tinplates are now fed singly to the magnetic feed platform 11 and are retained by the electro-magnets 11a the energization of which is controlled by the switch 61 and the mercury tube switch 26 in a manner to be referred to hereinafter. Assuming that a tinplate is released from the feed magnets 11a it falls on to the weighing platform 10 until it contacts with the flap 55 whereupon it is prevented from further movement on the weighing platform. The weight of the tinplate on the weighing platform 10 depresses the plate 16 and opens the circuit controlled by the platform switch. The breaking of this circuit breaks the circuit through the centralizing solenoid 18, the consequent falling of the armature 18ª, through the contacts 12ᵇ, 18ᵇ and 60, breaking the circuit through the locking solenoid 17 and thus permitting a weighing operation to take place. The breaking of the circuit controlled by the platform switch also de-energizes the delay action solenoid 19 thus permitting the other end of the switch lever 21 carrying the piston rod 22 of the air dashpot to move downwardly under the action of an initial loading against the resistance afforded by the air dashpot. This movement of the switch lever 21 rocks the plates 23 carrying the mercury switch tubes 24, 25, and 26 and causes these switches to complete the sections of the electrical circuits controlled thereby. The retarding of the tilting of the mercury tube switches 24, 25, and 26 which results from the air dashpot enables a weighing operation to be completed before the sequence of operations now to be described obtains. The completion of the circuit controlled by the mercury switch tube 24 upon the tilting of the switch lever 21 completes the circuit through the locking solenoid 17 whereby the flexible arm 32 carried by the weighing lever 12 is drawn towards the magnet pole 17ª and the weighing lever thus locked in the weighing position. If the tinplate is of the correct weight for its grade or within the tolerance limits allowed no movement of the weighing lever 12 obtains or a sufficient movement does not obtain for permitting the contact closing member 32ª to complete the circuit through one or other of the switches 32', 33 and consequently the solenoids 29, 30 of the plungers 29ª and 30ª governing the operation of the deflectors 27 and 28 are not energized. If, however, a sheet is under or over the prescribed weight the movement of the contact closing member 32ª completes the circuit through either the underweight switch 32' or the overweight switch 33 whereby the respective deflector 27 or 28 is moved into an obstructing position relatively to the path of the tinplate from the weighing platform so that when the plate is allowed to fall from the platform instead of passing over the surfaces of the deflectors as obtains in the case of a tinplate of correct weight the plate is directed by the deflector in the acting position to receptacles for underweight and overweight plates as the case may be.

The tilting of the switch lever 21 also results in the switch tube 25 completing the circuit through the solenoid 58 whereby the flap 55 is unlatched to permit of the tinplate sliding off the weighing platform under the action of gravity and of being graded as aforesaid. The removal of the tinplate from the weighing platform 10 enables the platform switch to close and so energize the centralizing solenoid 18 whereupon the armature 18ª either moves into contact with the poiseweight 12ª and moves it into the central position if the plate previously graded has been too light or serves as an abutment for the return of the weighing lever 12 to the central position should the preceding graded plate have been too heavy, the movement of the weighing lever 12 being permitted by reason of the closing of the platform switch re-energizing the delay action solenoid 19 and tilting the switch lever 21 so as to cause the mercury switch tubes 24, 25, and 26 to break their respective circuits. The movement of the armature 18ª of the centralizing solenoid 18, through the contacts 18ᵇ and 60, completes the circuit through the locking solenoid 17 and results in the weighing lever 12 being again locked in the centralized position. The raising of the armature 18ª also results in the switch contact 61 opening but as the switch tube 26 is in parallel with this switch in the circuit of the electromagnets 11ª of the magnetic feed platform 11 de-energization of the said electro-magnets to allow of the feed of the next plate to be graded is not permitted until the switch lever 21 returns to the normal position and so enabling the switch tube 26 also to open. The delay action of the switch lever 21 ensures that the previously graded plate shall have been completely discharged from the weighing platform and the flap 55 restored to the obstructing position before the next tinplate to be graded is allowed to pass on to the weighing platform, the sequence of operations is then repeated.

The use of the centralizing solenoid enables the speed of operation to be increased since the minimum of loss of time is involved in restoring the weighing platform 10 to the normal unloaded equilibrium position after a grading or sorting operation.

What I claim is:—

1. A machine for grading or sorting by weight embodying a weighing mechanism, a load receiving device from which the load tends to fall under the action of gravity, electrically controlled means for locking the weighing mechanism, electrically controlled means for restoring the weighing mechanism to the normal equilibrium position after a grading or sorting operation has been performed, electrically operated deflector mechanism associated with the weighing mechanism and adapted to be brought into operation for directing the load into a specified channel according to its grade or weight, movable means carrying the switch controlling the aforesaid locking means, means for electrically actuating said switch carrying means, means for delaying the movement of said switch carrying means and a switch incorporated in the load receiving device and adapted to be actuated by the loading of the load receiving device the actuation of said switch on the reception of a load effecting the unlocking of the weighing mechanism, the placing of the restoring means out of action and the actuation of the delay action switch carrying means.

2. A machine for grading or sorting by weight embodying a weighing mechanism, a load receiving device for said weighing mechanism from which the load tends to fall under the action of gravity, electrically controlled means which tends normally to maintain the load on the load receiving device, electrically controlled means for locking the weighing mechanism, electrically controlled means for restoring the weighing mechanism to the normal equilibrium position after a grading or weighing operation has been performed, an electrically controlled means associated with the weighing mechanism and adapted to be brought into operation in the event of the load being lighter than a predetermined weight to obstruct the path of discharge of the load from the load receiving device so as to deflect the load into a specified channel, an electrically operated means associated with the weighing mechanism and adapted to be brought into operation in the event of the load being heavier than a predetermined weight to obstruct the path of discharge of the load from the load receiving device so as to deflect the load into a specified channel, an electrically actuated movable means carrying switches controlling the aforesaid locking means and load retaining means, means for delaying the action of said movable switch carrying means and a switch incorporated in the load receiving device, and adapted to be actuated by the loading of the load receiving device, the actuation of the said switch on the reception of a load resulting in the placing of the restoring means out of action, the unlocking of the weighing mechanism and the actuation of the switch carrying means whereby the locking means is again brought into action and the load retaining means placed out of action, the consequent discharge of the load unlocking the weighing mechanism, bringing the contralizing mechanism into operation and returning the load retaining means to the retaining position, the delay action of the switch carrying means ensuring a sufficient period of time for a weighing operation to take place and for the deflector means to be brought into operation if required before the discharge of the load.

3. A machine for grading or sorting by weight according to claim 1, wherein electrically operated means is provided for regulating the feed to the load receiving device, said means being associated with the equlibrium restoring means so as to ensure that a feed shall not take place until the load receiving device is clear, the weighing mechanism locked with the equilibrium restoring means in action.

4. A machine for grading or sorting by weight according to claim 2 having means for adjusting the limits of weight within which the deflector means shall come into action.

5. A machine for grading or sorting by weight according to claim 1, wherein the movable switch carrying means is rockable under the control of electrical means against the resistance afforded by a dashpot.

6. A machine for grading or sorting by weight embodying a weighing lever, an adjustable resistant associated with said lever, an inclined load receiving device supported from said lever, an electrically controlled means which normally tends to retain the load on the load receiving device, an electrically controlled means for locking the weighing lever, an electrically controlled means for restoring the weighing lever to an equilibrium position after a grading or sorting operation has been performed, an electrically movable switch carrying means, a switch carried by said means controlling the operation of the locking means, a switch carried by said means controlling the operation of the load retaining means, an electrically operated deflector controlled through the weighing lever adapted to be brought into an obstructing position relatively to the discharge path of a load lighter than a predetermined amount, an electrically operated deflector controlled through the weighing lever and adapted to be brought into an obstructing position relatively to the discharge path of a load heavier than a predetermined load, means for delaying the action of the switch carrying means, and a switch incorporated in the load receiving device and adapted to be actuated by the loading of the load receiving device, said switch on loading effecting the putting out of action of the equilibrium restoring means, the unlocking of the weighing lever and the movement of the switch carrying means, the actuation of said switch after the discharge of the load effecting the bringing into action of the equilibrium restoring means and entailing the locking of the weighing lever, the restoration of the switch carrying means with the consequential bringing into action of the load retaining means, the deflectors returning to the out of action position upon the restoration of the weighing lever to the equilibrium position.

7. A machine for grading or sorting according to claim 6 wherein the electrical circuits of the deflectors is controlled by an arm attached to the weighing lever, one or other circuit being completed according to the movement of the weighing lever.

8. A machine for grading or sorting by weight embodying a weighing lever, an adjustable resistant associated with said lever, a load receiving device mounted on said lever, electrically controlled means for feeding a load on to said load receiving device, an electrically controlled means which normally tends to maintain a load on the load receiving device, an electrically controlled means for restoring the weighing lever to its equilibrium position after a grading or sorting has been performed, electrically controlled means for locking the weighing lever, an electrically controlled movable switch carrying means, a switch carried by said means controlling the operation of the locking means, a switch carried by said means controlling the operation of the load retaining means, a switch carried by said means in the circuit of the feed control means, a switch controlled by the equilibrium resorting means and also in the circuit of the feed control means so that a feed cannot take place until both these switches so permit, an electrically operated deflector controlled through the weighing lever adapted to obstruct the discharge path of a load lighter than a predetermined amount, an electrically operated deflector controlled through the weighing lever adapted to obstruct the discharge path of a load heavier than a predetermined amount, means for delaying the action of the switch carrying means and a switch incorporated in the load receiving device said switch on loading effecting the putting out of action of the equilibrium restoring means, the unlocking of the weighing lever and the movement of the switch carrying means, the actuation of said switch after the discharge of the load bringing into action the equilibrium restoring means and entailing the locking of the weighing lever and the return of the switch carrying means to its normal position whereby the load retaining means is brought into action, the deflectors returning to the out of action position upon the restoration of the weighing lever to an equilibrium position.

WILLIAM JONES.